J. M. McPHEETERS.
VEHICLE WHEEL.
APPLICATION FILED SEPT. 28, 1915.

1,194,651.

Patented Aug. 15, 1916.

WITNESSES:
L. J. Forde
J. H. Herring

INVENTOR
John M. McPheeters.
BY Strong & Townsend
ATTORNEYS.

UNITED STATES PATENT OFFICE.

JOHN M. McPHEETERS, OF PALO ALTO, CALIFORNIA.

VEHICLE-WHEEL.

1,194,651.  Specification of Letters Patent.  Patented Aug. 15, 1916.

Application filed September 28, 1915. Serial No. 53,027.

*To all whom it may concern:*

Be it known that I, JOHN M. McPHEETERS, a citizen of the United States, residing at Palo Alto, in the county of Santa Clara and State of California, have invented new and useful Improvements in Vehicle-Wheels, of which the following is a specification.

This invention relates to vehicle wheels, and has for its object to provide a device of this character upon which a pneumatic tire may be positioned or from which it may be removed with improved facility and ease.

Heretofore automobile tires have been difficult of removal from, or application to, the ordinary forms of wheels. This is so because of the fact that the casing must fit snugly upon the rim thereof and excessive friction between the bearing portion of the tire and the periphery of the wheel, in moving a tire into position thereon, continues during the entire movement of the tire across the rim. This varies in distance from three to four inches in ordinary instances. Aside from this, a metal rim, which has carried the same tire for a long period of time, becomes rusted, and no force can be exerted sufficient to slide a snugly fitting casing from this rusted expanse of rim. Many attempts have been made to overcome this difficulty, but none, so far as known to me, has been of practical form, or has ever come into use. I meet the problem and effectually solve it by the simple provision of a wheel rim which will have a narrower diameter at the outer side of its periphery than at the inner side thereof, by reason of which the bearing flanges of the tire casing will not come into frictional engagement with the wheel rim until they have almost reached their ultimate position thereon, and in being removed will readily release themselves from the rim. A removable beveled ring is made use of on the outer side of the wheel rim to provide an even setting for the tire.

One form which my invention may assume is exemplified in the following description and illustrated in the accompanying drawings, in which—

Figure 1:
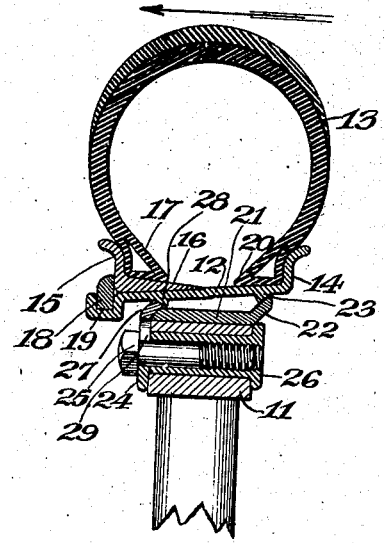
Figure 2:
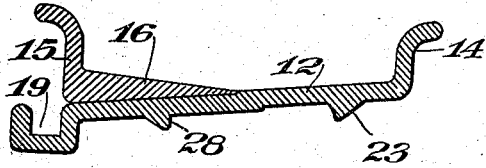
Figure 3:
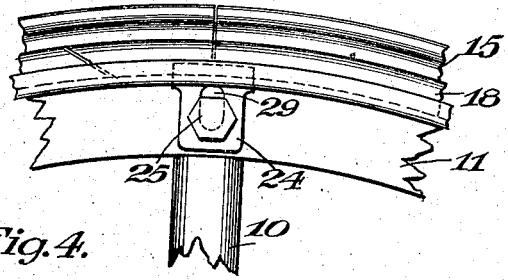
Figure 4:
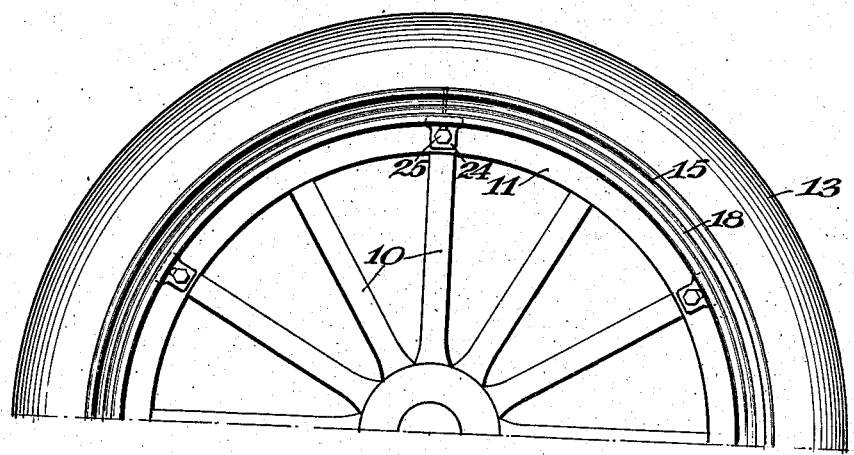

Figure 1 shows a cross sectional view of a portion of a wheel and tire embodying my invention. Fig. 2 shows a similar view, illustrating a portion of the wheel rim. Fig. 3 shows a side elevation of a portion of a wheel, Fig. 4 shows a side view of the wheel, with the tire applied thereto.

Referring now to the form of the device illustrated in the drawing, it will be seen that I employ a vehicle wheel having spokes 10, a felly 11, and a demountable, beveled or slanted rim 12. Upon the rim is carried a pneumatic tire casing 13, held in place by an inside flange 14 and an outer, detachable, split-flange 15, integral with which is a beveled ring 16. The casing has the usual flanged bearings 17 which rest, one upon the periphery or rim of the wheel and the other upon the beveled ring 16. A split locking ring 18, lying in a channel 19 formed on the outer edge of the rim, holds the flange 15 removably in place.

It will be understood that in order to remove the tire casing from its position on the rim, it is necessary to detach the locking ring 18 and then manually to force the casing off in the direction of the arrow. Where the rim is level or of uniform diameter at either side, the frictional engagement between the flanges 16 and periphery of the rim continues with the same pressure throughout the entire movement of the inside flanged bearing across the full width of the rim. Manifestly, it becomes a difficult task to drag the unyielding flanges 16 this distance, and particularly so because of the disposition of the corner 20 of the inside flange which, upon meeting with restraint, is caused to move inwardly and thus increase the friction between the parts.

By beveling or slanting the peripheral surface of the rim, as shown, the extent of excessive frictional engagement is considerably shortened, so that, after the initial movement of the tire, such as would be necessary to break its seal, the parts become freed and the casing can be bodily withdrawn without difficulty when the beveled ring 16 has first been removed. The extent of slanting or beveling of the rim need not be great as a slight variation is sufficient to relieve friction and overcome the binding action of the corner 20 in removing the tire. Obviously, the same advantages present when removing the tire apply also when putting a tire in place.

I employ the beveled ring 16 which is adapted to fit on the outer edge of the slanted rim 12 and be of such thickness as to offset the slanting of the rim so that the ordinary form of casing, when applied thereto, will be given a level setting. The ring 16 is preferably split to facilitate removal of the same from the rim, and by forming it integral with the outer rim flange it is easily manipulated.

It is obvious that the particular construction of the wheel rim may be varied according to the design required. This rim may either be a separate and demountable piece, as shown in the drawings, or formed integrally with the felly. My invention, obviously, can be applied to either form. I prefer, however, the form shown, on account of its simplicity and economy of construction; the rim being of uniform thickness throughout its width can be shaped in ordinary rollers.

I provide an improved and simplified fastening for the slanted rim, comprising a ledger plate 21 fixed upon the felly of the wheel and provided on its inner edge with an upwardly and outwardly directed flange portion 22 engaging with the outside of a transversely tapered flange 23 on the under side of the rim 12. For holding the ledger plate in place, I provide a plate 24 arranged at intervals on the outer side of the felly and secured thereon by means of a screw-threaded bolt 25, fitted in a socket 26 embedded in the felly. The plate 24 has its upper end an inwardly extending angular abutment 27 engaging with the outer end of the ledger plate and bearing against the outside of a transversely tapered flange 28, similar to flange 23, and formed also on the under surface of the rim 12. The plate 24 is provided with an elongated opening 29 where the bolt 25 passes through, so that it may be moved radially on the felly to facilitate the removal of the rim.

In operation, the tightening of the bolts 25 locks the flanges 23 and 28 in place between the angular extensions 22 and 27, thereby securing the rim in place. Obviously, this construction offers advantages of adjustment to replace wear and maintains the rim securely in place at all times.

It is apparent that changes in the details of construction and arrangement of the various parts may be resorted to without departing from the spirit of my invention as disclosed in the appended claims.

Having thus described my invention, what I claim and desire to secure by Letters Patent is—

1. In combination, a wheel, a slanted rim therefor of greater diameter at its inner edge than at its outer edge, the outer edge of the rim being provided with a peripheral channel, a tire-retaining flange on the inner edge of the rim, a removable leveling ring on the outer edge of the rim, a tire-retaining flange on the ring, and a locking ring engaged in the rim channel and provided with a flat side to abut and lock the leveling ring to the rim.

2. In combination, a wheel, a slanted rim therefor of greater diameter at its inner edge than at its outer edge, the outer edge of the rim being provided with a peripheral channel, a tire-retaining flange on the inner edge of the rim, a removable leveling ring on the outer edge of the rim, a tire-retaining flange on the ring, and a split locking ring engaged in the rim channel and provided with a flat side to abut and lock the leveling ring to the rim.

In testimony whereof I have hereunto set my hand in the presence of two subscribing witnesses.

JOHN M. McPHEETERS.

Witnesses:
GEORGE C. TANNER,
HENRY SCHOMBERG.